(12) United States Patent
Wacker et al.

(10) Patent No.: US 6,622,070 B1
(45) Date of Patent: Sep. 16, 2003

(54) DIAGNOSTIC DEVICE FOR MONITORING A SUB-SYSTEM IN A MOTOR VEHICLE

(75) Inventors: Heinrich Wacker, Ebersbach; Erwin Burner, Adelber; Peter Reiser, Esslinger, all of (DE)

(73) Assignee: J. Eberspacher GmbH & Co. KG (DE)

( * ) Notice: Subject to any disclaimer, the term of this patent is extended or adjusted under 35 U.S.C. 154(b) by 0 days.

(21) Appl. No.: 09/423,395

(22) PCT Filed: May 22, 1998

(86) PCT No.: PCT/DE98/01455

§ 371 (c)(1),
(2), (4) Date: Jan. 21, 2000

(87) PCT Pub. No.: WO98/55878

PCT Pub. Date: Dec. 10, 1998

(30) Foreign Application Priority Data

Jun. 6, 1997 (DE) .......................................... 197 23 831

(51) Int. Cl.[7] .............................. G01M 19/00; G06F 7/00
(52) U.S. Cl. ........................ 701/29; 701/31-33; 701/35; 701/36; 73/116; 73/117.3; 73/118.1; 73/119 A; 340/439; 340/825.69
(58) Field of Search .............................. 701/29, 31, 32, 701/33, 36, 35; 73/116, 117.3, 118.1, 119 A; 340/439, 825.69, 438

(56) References Cited

U.S. PATENT DOCUMENTS

| | | | | |
|---|---|---|---|---|
| 4,258,421 A | * | 3/1981 | Juhasz et al. | 364/424 |
| 4,602,127 A | * | 7/1986 | Neely et al. | 179/2 A |
| 4,694,408 A | * | 9/1987 | Zaleski | 364/551 |
| 4,748,843 A | * | 6/1988 | Schafer et al. | 73/117.3 |
| 4,796,206 A | * | 1/1989 | Boscove et al. | 364/551.01 |
| 4,989,146 A | * | 1/1991 | Imajo | 364/424.04 |
| 5,150,609 A | * | 9/1992 | Ebner et al. | 73/117.3 |
| 5,648,898 A | * | 7/1997 | Moore-McKee et al. | 364/191 |
| 5,712,782 A | * | 1/1998 | Weigelt et al. | 364/424.07 |
| 5,884,202 A | * | 3/1999 | Arjomand | 701/29 |
| 6,032,088 A | * | 2/2000 | Feldmann et al. | 701/33 |

FOREIGN PATENT DOCUMENTS

| | | |
|---|---|---|
| DE | 37 27 549 | 2/1988 |
| DE | 37 17 012 | 12/1988 |
| DE | 41 40 804 | 3/1993 |
| DE | 195 34 833 | 4/1996 |
| DE | 195 40 943 A1 | 5/1997 |
| DE | 41 40 804 C | 3/1998 |
| EP | 0 704 343 A | 4/1996 |

* cited by examiner

Primary Examiner—William A. Cuchlinski, Jr.
Assistant Examiner—Ronnie Mancho
(74) Attorney, Agent, or Firm—McGlew and Tuttle, P.C.

(57) ABSTRACT

The invention relates to an on-board or off-board diagnostic device (1) enabling a vehicle manufacturer or the like ("clients") to carry out a client diagnosis (N) or to monitor a motor vehicle sub-system (2) manufactured by a special supplier, using the vehicles's data collection line (3) or data bus and comprising an electronic control device allocated to said sub-system (2) which is connected to an operating unit (5) for instance, by means of a line (HS). According to the invention, a specially coded signal (S) is fed into the electronic control device (4) in order to switch from client diagnosis mode (N) to special supplier diagnosis mode (U) so as to provide extended or modified sub-system (2) data on an already existing line (HS).

20 Claims, 2 Drawing Sheets

DIAGNOSTIC DEVICE FOR MONITORING A SUB-SYSTEM IN A MOTOR VEHICLE

FEATURE OF THE INVENTION

The present invention pertains to an on-board or off-board diagnostic device for checking a partial system of a motor vehicle, which partial system was manufactured by a special manufacturer, by the motor vehicle manufacturer or the like ("customer") for a customer diagnosis by means of the vehicle's data collection line or vehicle data bus, with an electronic control device, which is associated with the partial system and which is connected, e.g., to an operating device via a line.

BACKGROUND OF THE INVENTION

An on-board diagnostic device of the above-described type for checking partial systems of a motor vehicle has been known from DE 195 40 943 A1, in which the deviation from the normal course of a control for polling testing and checking routines by entering certain commands to the diagnostic line is made possible, as it had also been described, in principle, elsewhere (see, e.g., IPSO/DAIS 14229 draft from 1995, item 9 "Input/Output Control functional unit" and item 10 "Remote Activation of Routine functional unit;" IPSO/DAIS 14230 draft from 1995, item 9 "Input/Output Control functional unit" and item 10 "Remote Activation of Routine functional unit"). As can be determined from the above-mentioned documents, there are many standards and other specifications for the diagnosis of complex electronic systems.

The problem of a special manufacturer of a vehicle partial system or of an outside vendor supplying accessories for motor vehicles is that each vehicle manufacturer requires compliance with his own diagnostic instructions and does not permit any other diagnostic protocols besides it. For example, one vehicle manufacturer requires a diagnosis according to Keyword Protocol 2000 for a heater and does not allow any commands on the data line other than those described in a certain diagnostic specification of the vehicle manufacturer.

However, an outside vendor supplying accessories for. Motor vehicles wants to supply motor vehicle partial systems, e.g., motor vehicle auxiliary heaters (parking heaters), to different motor vehicle manufacturers, but such a vendor must provide a different diagnostic interface for each motor vehicle manufacturer according to the state of the art, taking into account the above mentioned specifications, i.e., a partial system, e.g., a heater, manufactured for a given motor vehicle manufacturer, can be addressed only with the commands of the customer diagnosis associated with the given motor vehicle manufacturer. A diagnostic system of another motor vehicle manufacturer requires correspondingly different commands for the same type of heater. However, the above-mentioned outside vendor of motor vehicle accessories, the special manufacturer of the motor vehicle partial system, including the corresponding on-board diagnostic device, requires a set of commands going beyond the scope. Of functions of the motor vehicle manufacturers with such functions as, e.g., "Program data set," "Poll end-of-tape test," etc. However, these additional functions are not made available to the motor vehicle manufacturers, mainly for reasons of reliability of function and because of the risk of operating error.

The above-mentioned additional set of commands is handled according to the state of the art via the data line (K line) provided for the customer of the motor vehicle manufacturer, because an additional plug pin with an additional diagnostic interface for the special manufacturer for a special manufacturer diagnosis would mean a rather significant, expensive extra effort. This is also frequently undesirable on the part of the motor vehicle manufacturer, because a hidden switchover from customer diagnosis to special manufacturer diagnosis would mean the possibility of an incorrect activation and a breakdown of the data transmission on the diagnostic bus in the motor vehicle.

SUMMARY AND OBJECTS OF THE INVENTION

Based on the above-described state of the art, the object of the present invention is to provide an on-board diagnostic device of the type described in the introduction, with which the switch over from customer diagnosis to special manufacturer diagnosis continues to be possible, but the switch over is protected such that an accidental switch over is ruled out during normal operation of the vehicle.

According to the invention, an on-board or off-board diagnostic device and system are provided for customer diagnosis or for checking a partial system of a motor vehicle manufactured by a special manufacturer, by the motor vehicle manufacturer or the like ("customers"). A data collection line of the vehicle or vehicle data bus is used. An electronic control device is associated with the partial system and is connected to an operating device via a control line. The device, system and method of the invention provide a special manufacturer diagnosis which is locked during customer diagnosis. A specially coding signal is fed into the electronic control device on the control line. This unlocks the manufacturer diagnosis for switching over from the customer diagnosis to the special manufacturer diagnosis for the purpose of making available expanded or changed data information on the partial system.

The essence of the present invention is that a specially coded signal is fed into the electronic control device on a line of the system that is already present anyway for switching over from customer diagnosis to special manufacturer diagnosis for the purpose of making available expanded and/or changed data information on the partial system.

The partial system of the motor vehicle is especially a motor vehicle auxiliary heater or parking heater operated in an engine-independent manner.

The line that is present anyway, via which the coded switch over signal is fed in, is preferably the control line and especially the switch-on line of the partial system.

However, the line that is present anyway may also be another, already present line of the motor vehicle partial system or of a component of the partial system.

The coded signal is especially defined rapid on/off switching sequences, which do not compromise the normal on/off switching function of the partial system at the consumer or user.

The coded signal may also be defined voltage levels, which do not compromise the normal function of the partial system at the customer or user.

The switch over between customer diagnosis and special manufacturer diagnosis may be performed in a single-wire system, especially a K line ("K line diagnosis"), but also in a multiple-line system, especially a CAN bus.

The separation of the lines is preferably brought about by unplugging the corresponding plugs and installing an adapter plug.

The hardware-side and software-side interlocking of the partial systems, especially of the heater manufacturer diagnostic functions, is thus made possible by the present invention by the use of at least one additional plug pin. Only the original equipment supplier diagnosis can be accessed via the diagnostic line alone. After feeding a certain coding to, e.g., the switch-on signal, it is possible to switch over to manufacturer diagnosis. The additional diagnostic functions of the manufacturer diagnosis are needed especially for the development of the (heating) device (parameterization, readout, testing, etc.). A special device manufacturer or his service organization can access all control devices for different original equipment suppliers with a uniform software without having to purchase their expensive diagnostic devices. The diagnosis of the original equipment suppliers or customers is not interfered with. Without using the present invention, uniform access to the (heater) control devices in the motor vehicle is not possible. The variety of variants is enormous in this case.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE EMBODIMENT

Figure 1:
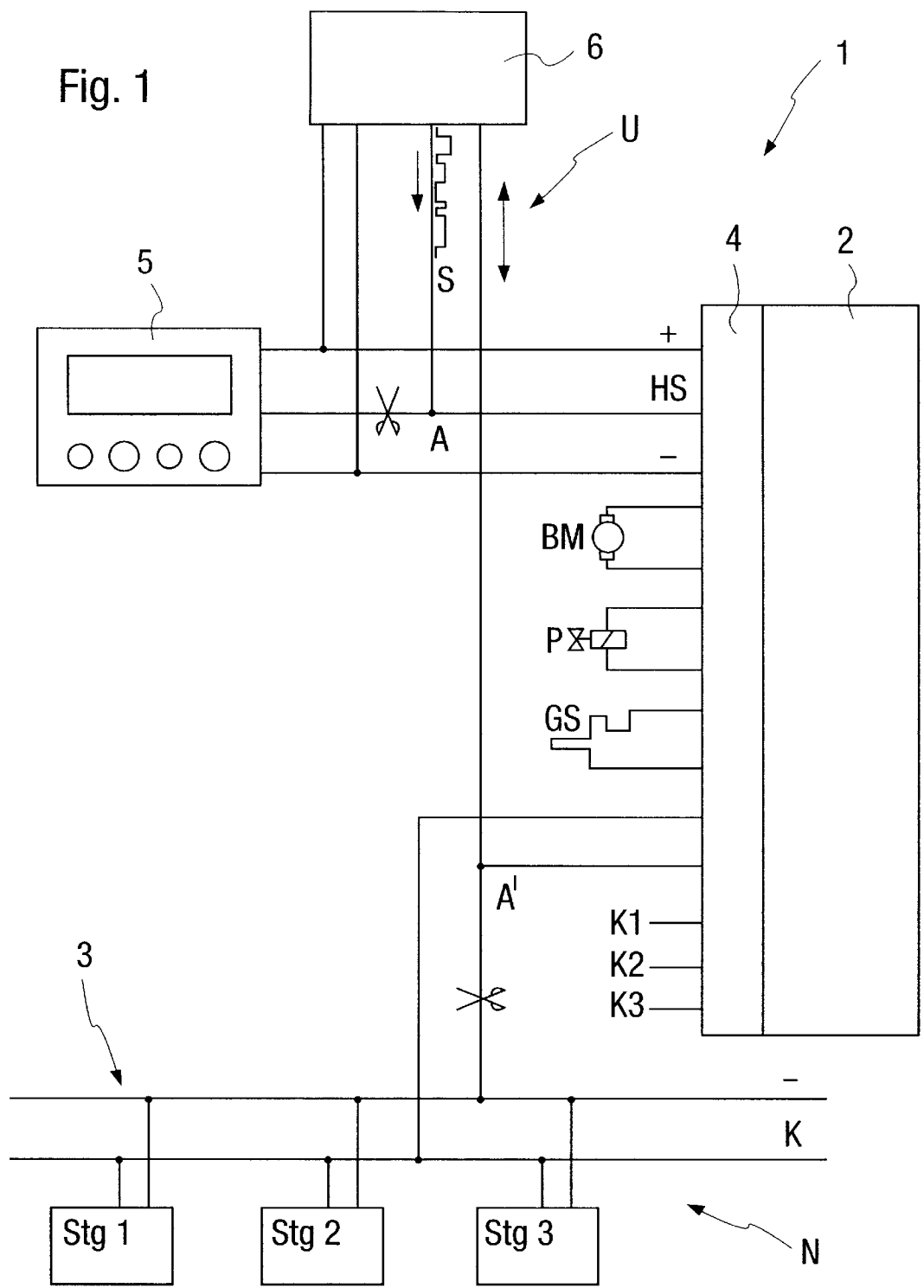
FIG. 1 is a schematic representation of a control device circuit diagram of a motor vehicle parking heater for customer diagnosis as well as for special manufacturer diagnosis according to the invention.

FIG. 1 schematically shows a motor vehicle partial system 2 manufactured by a special manufacturer in the form of a motor vehicle auxiliary heater or parking heater, with which an electronic control device 4 for the operation or control of the heater and of the individual components of the heater is associated.

Individual components of the system according to FIG. 1 are, e.g., the burner motor BM, whose speed of rotation is to be controlled, the fuel pump P, and the glow plug G.S.

Additional components K1, K2, K3, etc., may be provided in the system.

The parking heater 2 can be operated and especially switched on and off by an operating device 5 via a control line HS.

An on-board diagnostic device 1 for checking the parking heater manufactured by the special manufacturer by the motor vehicle manufacturer, original equipment supplier, or the like ("customers"), which comprises especially individual control devices Stag 1, Stag 2, Stag 3, etc., is provided for a known per se, so-called customer diagnosis. The individual control devices Stg 1, Stg 2, Stg 3, etc., are put into operation with the system switched on and/or off to represent individual single data of certain individual components BM, P, G.S., K1, K1, K1, etc., of the system and incorrect settings of individual components are correspondingly corrected if necessary. The individual control devices Stg 1, Stg 2, Stg 3, etc., as well as the electronic control device 4 of the parking heater are connected to the vehicle data bus 3, especially to the single-wire K line K of the motor vehicle.

The features mentioned above concerning a customer diagnosis are known per se. For switching over from customer diagnosis N to special manufacturer diagnosis U for making available expanded or changed data information on the partial system 2, especially on the motor vehicle parking heater according to FIG. 1, a specially coded signal S is fed according to the present invention on the control line HS, which is present anyway, into the electronic control device 4, as is also apparent from the flow chart according to FIG. 2. The control device 4 of the partial system 2 may be switched on or off during this process.

Figure 2:
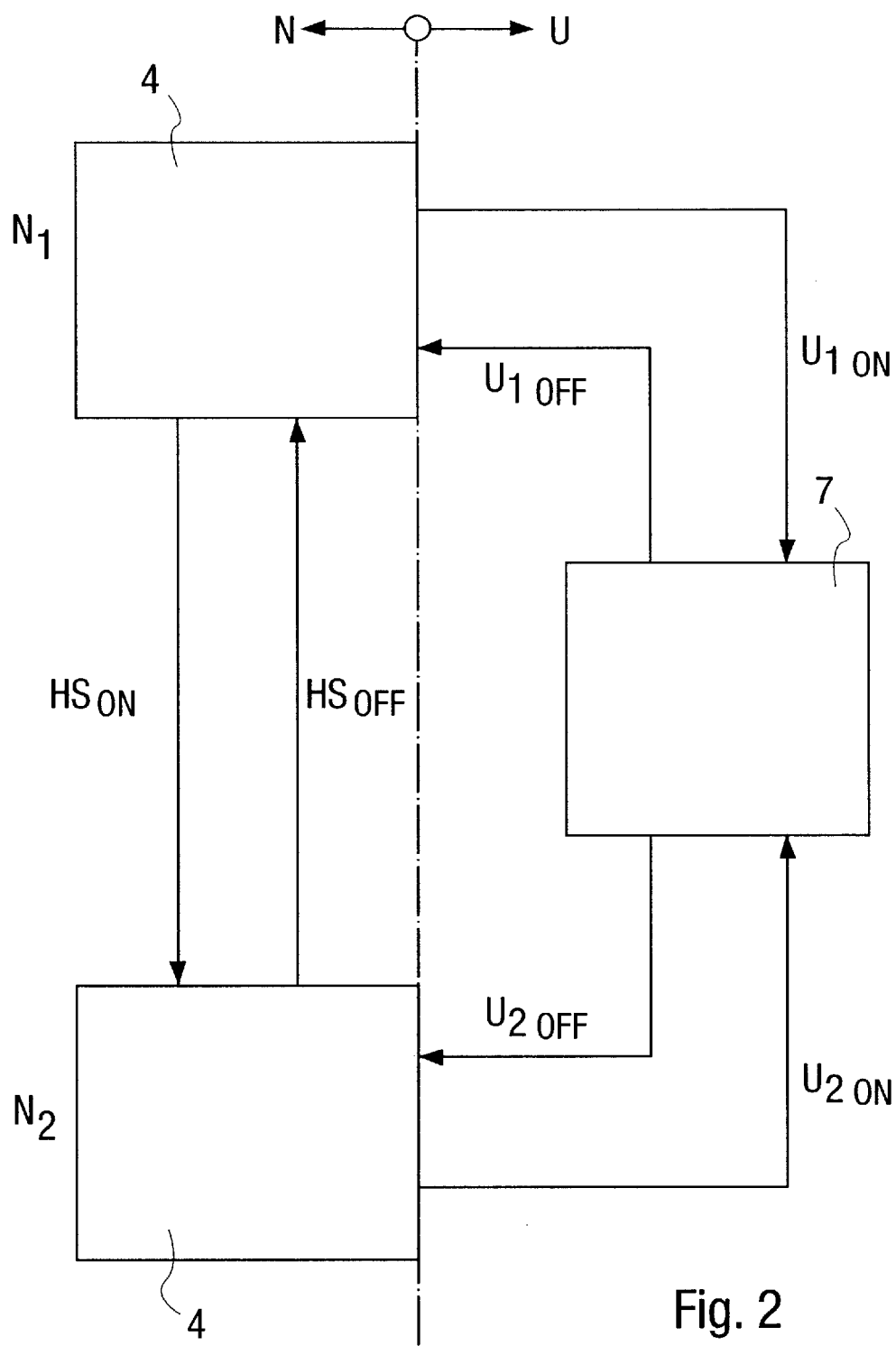
FIG. 2 is a schematic flow chart for customer diagnosis as well as for special manufacturer diagnosis in a circuit diagram according to FIG. 1.

The control line AS is especially the switch-on line of the partial system 2, via which the electronic control device 4 and the parking heater 2 are switched on according to FIG. 2, bottom left, and switched off according to FIG. 2, top left, by the operating device 5 in normal operation. The switched-off heater is connected to UB and to a permanent battery voltage (permanent plus) and is possibly in a standby operation.

For switching over to special manufacturer diagnosis U, the control line HS is simply separated at A and the vehicle data collection line 3 is separated at A' and is provided with an interface that is accessible to the special manufacturer only and is equipped with a special adapter plug. If the special testing device 6 of the special manufacturer with the corresponding expanded test program for a special manufacturer diagnosis (e.g., tape end, customer service shop, development systems, . . . ), which also knows the coded switch-on signal S for the motor vehicle parking heater, is connected, the expanded data can be polled from the paroling heater via the control line HS and possibly subjected to further evaluation, without having to resort to the diagnostic device of the motor vehicle manufacturer.

It is obvious that each heater of the same type, even if installed in different motor vehicles of different manufacturers, can be always operated with the same access code and always with the same software of the testing device 6 of the special manufacturer.

FIG. 2 shows the flow chart for a switching over from customer diagnosis N according to the left of the dash-dotted line to special manufacturer diagnosis according to the right of the dash-dotted line.

The control device 4 of the heater is switched off (HS off) in the case of an individual customer diagnosis N1 according to the top left part of the FIG. 2.

The control device 4 of the heater is switched on (HS on) in the case of an individual customer diagnosis N2 according to the bottom left part of FIG. 2.

For a test operation 7 of the system at the special manufacturer, the interfaces A and A' according to FIG. 1 are set up and activated, and the coded signal S is entered via the control line HS after connecting the testing device 6, either with the control device 4 switched off according to FIG. 2, top left (1n on), or with the control device 4 switched on according to FIG. 2, bottom left (Un on). Resetting to customer diagnosis N1 and N2 is performed after a test operation 7 via U1 off and U2 off, respectively.

While a specific embodiment of the invention has been shown and described in detail to illustrate the application of the principles of the invention, it will be understood that the invention may be embodied otherwise without departing from such principles.

What is claimed is:

1. A motor vehicle diagnosis device for a customer diagnosis of a partial system manufactured by a special manufacturer and for a special manufacturer diagnosis of said partial system, the motor vehicle having a vehicle data bus, the partial system having an electronic control device associated with the partial system, a partial system control line and an operating device for operating and for switching on and off the partial system via said system control line, the special manufacturer diagnosis being activated by a specifically coded signal fed into to the electronic control device for locking the customer diagnosis and switching over from said special manufacturer diagnosis for the purpose of making available expanded or changed data information on the partial system.

2. The device in accordance with claim 1, wherein said partial system is a motor vehicle heater operated in an engine-independent manner.

3. The device in accordance with claim 1, wherein said system control line is one of a control line with a switch-on line for the partial system or another partial system line.

4. The device in accordance with claim 3, wherein said coded signal is defined by rapid on/off switching sequences, which do not affect an off switching function of the partial system electronic control device.

5. The device in accordance with claim 1, wherein said coded signal includes defined voltage levels, which do not correspond to control signals for a normal function of the partial system electronic control device.

6. The device in accordance with claim 1, wherein the switch over between the customer diagnosis and said manufacturer diagnosis takes place in a single-wire system.

7. The device in accordance with claim 6, wherein said single-wire system is a K line of a vehicle data bus.

8. The device in accordance with claim 1, wherein the switch over between the customer diagnosis and said manufacturer diagnosis takes in a multiple-line system, especially a CAN bus.

9. The device in accordance with claim 1, wherein a separation of said system control line from said operating device is brought about by unplugging a plug connecting said system control line to said operating device and by installing at least one adapter plug and a separation of said vehicle data collection line from said partial system is brought about by unplugging a plug connecting said vehicle data collection line from said partial system.

10. A motor vehicle on-board or off-board diagnostic system, the system comprising:
   a motor vehicle having a vehicle data bus used for customer diagnosis;
   a partial system having an electronic control device, said partial system being manufactured by a special manufacturer or by the motor vehicle manufacturer, said partial system being connected to said vehicle data bus;
   a partial system control line connected to said electronic control device;
   an operating device connected to said partial system control device via said partial system control line and for switching on and off the partial system via said partial system control line;
   a testing device connectable to said partial system control line for sending a signal to said electronic control device via said partial system control line for switching over from said customer diagnosis to said manufacturer diagnosis for the purpose of making available expanded or changed data information on the partial system.

11. The system in accordance with claim 10, wherein said partial system is a motor vehicle heater operated in an engine-independent manner.

12. The system in accordance with claim 10, wherein the system control line is one of a control line with a switch-on line for the partial stem or another partial system line.

13. The system in accordance with claim 11, wherein said coded signal is defined by rapid on/off switching sequences, which do not affect an off switching function of the partial system electronic control device.

14. The system in accordance with claim 11, wherein said coded signal includes defined voltage levels, which do not compromise the formal function of the partial system at the customer or at the user.

15. The system in accordance with claim 11, wherein the switch over between the customer diagnosis and said manufacturer diagnosis takes place in a single-wire system.

16. The system in accordance with claim 15 wherein said single-wire system is a K line of a vehicle data bus.

17. The system in accordance with claim 11, wherein the switch over between the customer diagnosis and said manufacturer diagnosis takes in a multiple-line system, especially a CAN bus.

18. The system in accordance with claim 11, wherein a separation of said system control line from said operating device is brought about by unplugging a plug connecting said system control line to said operating device and by installing at least one adapter plug and a separation of said vehicle data collection line from said partial system is brought about by unplugging a plug connecting said vehicle data collection line from said partial system.

19. A motor vehicle on-board or off-board diagnostic method for a customer diagnosis or a special manufacturer diagnosis for checking a partial system manufactured by a special manufacturer or by the motor vehicle manufacturer, the method comprising the steps of:
   using a motor vehicle having a data collection line or a vehicle data bus;
   providing a partial system having an electronic control device associated with the partial system;
   connecting the partial system to an operating device via a system control line;
   providing a manufacture diagnosis using the vehicle data bus;
   providing a specially coded signal and feeding the signal into the electronic control device on the system control line for switching electronic control device over from said customer diagnosis to said special manufacturer diagnosis.

20. The method in accordance with claim 19, wherein said partial system is a motor vehicle heater operated in an engine-independent manner.

* * * * *